ical Patent [19] [11] 4,214,848
Verwey et al. [45] Jul. 29, 1980

[54] PALLETIZER

[75] Inventors: William G. A. Verwey, Phoenix; Stephen Stanton, Baltimore, both of Md.

[73] Assignee: Precision Industries, Inc., Baltimore, Md.

[21] Appl. No.: 772,143

[22] Filed: Feb. 25, 1977

[51] Int. Cl.² ............................................. B65G 57/09
[52] U.S. Cl. ...................................... 414/77; 198/796; 414/89
[58] Field of Search ............... 214/6 P, 6 H, 6 DK, 214/6 FA; 198/482, 796, 800; 414/77, 89

[56] References Cited

U.S. PATENT DOCUMENTS

| | | | |
|---|---|---|---|
| 3,224,564 | 12/1965 | Kay | 198/796 |
| 3,295,703 | 1/1967 | Schiepe | 214/6 FA |
| 3,346,128 | 10/1967 | Hullhorst | 214/6 DK |
| 3,768,807 | 10/1973 | Spengler | 214/6 DK |
| 3,827,577 | 8/1974 | Kurk et al. | 214/6 P |
| 3,986,621 | 10/1976 | Bowser | 214/6 P |
| 4,024,965 | 5/1977 | Marth et al. | 214/6 P |
| 4,030,620 | 6/1977 | Euverard et al. | 214/6 DK |

Primary Examiner—John J. Love
Assistant Examiner—Ross Weaver
Attorney, Agent, or Firm—Seidel, Gonda, Goldhammer & Panitch

[57] ABSTRACT

Apparatus is provided for arranging a row of bundles, preferably tied or untied bundles of folded or unfolded corrugated boxes or blanks, into stacks which include a plurality of layers of one or more bundles. The apparatus includes a feeding conveyor for feeding a row of bundles to a loading conveyor. A worker is stationed at the loading conveyor and functions to arrange the bundles into a layer on the loading conveyor. The loading conveyor then operates to transfer the layer of bundles to a transfer station on a vertical conveyor. Alternatively, the worker can arrange the bundles directly at the transfer station.

The vertical conveyor includes a plurality of carrier plates which each operate to lift a layer of bundles from the transfer station and transfer it to a delivery station on the other side of the vertical conveyor. Each carrier plate includes a plurality of pushers so that the next carrier plate operates to push the layer of bundles from the delivery station onto a stripping conveyor which pushes the layer against a striker plate located above a downstacker. A stripping conveyor surrounds the downstacker and includes at least one opening therein through which the layer of bundles is deposited onto a movable platform of the downstacker or is deposited onto a layer of bundles which was previously deposited on the movable platform. The platform is incrementally actuated downwardly each time another layer of bundles is deposited thereon to form a stack of the desired height. The movable platform is then actuated downwardly to its discharge position, and the formed stack is then discharged from the downstacker, and straps are applied thereto. Actuating means are also provided for supplying control signals to the loading conveyor and the vertical conveyor to stop their operation while the platform is being lowered toward its discharge position and being returned to its uppermost position to receive the next layer of bundles.

51 Claims, 9 Drawing Figures

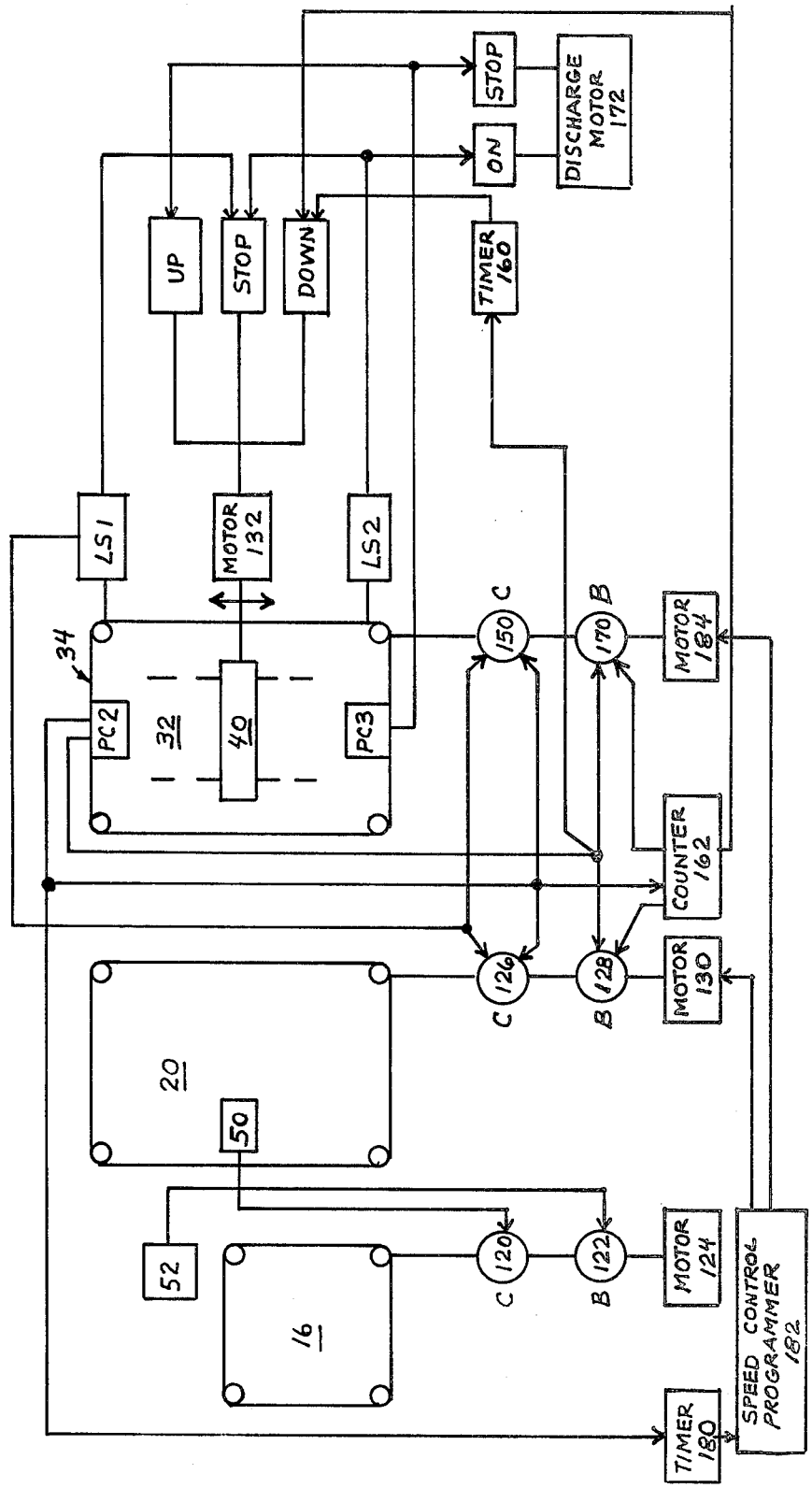

PALLETIZER

FIELD OF THE INVENTION

The present invention relates generally to material-handling apparatus, and specifically to a system for arranging one or more bundles into layers and for transferring the layers to form stacks on pallets.

BACKGROUND OF THE INVENTION

Material-handling apparatus for forming pallet loads is well known. For example, in the box-folding industry, corrugated board and boxes are folded into a flat configuration and then stacked to form bundles, which may be either untied or tied. The bundles are then arranged into layers in any desired pattern, and then the layers are stacked on a pallet for shipment.

In one palletizing system presently being used, the bundles are supplied by an inclined conveyor to a downstacker having a retractable plate for receiving and depositing layers or bundles onto the downstacker to form the desired stack. Typically, a worker is located at the downstacker on an elevated platform and operates to arrange the bundles supplied by the inclined conveyor in the desired pattern on the retractable plate. Then, the worker operates to retract the plate so that the layer of bundles is deposited onto the downstacker. In such systems, a worker is also required to be stationed at the input end of the inclined conveyor in order to insure that the bundles are properly transferred thereto from previous work stations and also to insure that untied bundles disposed on the inclined conveyor do not topple over.

Accordingly, it would be highly desirable to provide a palletizing system which eliminates the need for a worker at the downstacker, in addition to the worker at the input end of the inclined conveyor and also allows higher bundles to be employed.

Broadly, it is an object of the present invention to provide a palletizing system and control therefor which overcomes one or more of the problems of present palletizing systems. Specifically, it is within the contemplation of the present invention to provide a palletizing system which automatically transfers layers of one or more bundles from a loading conveyor to a downstacker and forms the layers into stacks on pallets.

It is a further object of the present invention to provide a palletizing system for coordinating and synchronizing the various functions of supplying bundles to a loading conveyor, arranging the bundles into layers, transferring the layers of bundles to a downstacker, forming the layers into stacks on pallets, strapping the stack, and discharging the loaded pallet ready for shipment.

It is a still further object of the present invention to provide a palletizing system which is controlled to intermittently stop the loading conveyor and vertical conveyor while a formed stack is being transferred to the discharge position of the downstacker and then discharged for shipment.

It is a still further object of the present invention to provide an improved palletizing system which eliminates the need for a worker positioned at the downstacker, since in the present invention, the bundles are formed into layers by a worker positioned at the infeed end of the system rather than at the downstacker.

It is still further object of the present invention to provide an improved palletizing system which employs a vertical conveyor having horizontally-disposed carriers which always maintain the layers in a horizontal orientation and, therefore, eliminates the need for inclined conveyors which have the inherent drawback that high bundles tend to topple over.

SUMMARY OF THE INVENTION

Briefly, in accordance with the principles of the present invention, there is provided an improved palletizing system for organizing flat boxes (commonly referred to in the industry as corrugated containers) into bundles and one or more bundles into layers at the infeed end of the palletizing system, and for automatically transferring layers of bundles to a downstacker where they are formed into the desired stacks on pallets. More particularly, the system includes an infeed conveyor for supplying rows of bundles to a work station at which a worker is located who operates to remove bundles from the infeed conveyor and arrange them into a layer of a desired pattern on a loading conveyor. The loading conveyor then operates to transfer the layer of bundles to a transfer station on a vertical conveyor. The loading conveyor is responsive to a control signal from the vertical conveyor to actuate the loading conveyor to supply each layer of bundles to the transfer station of the vertical conveyor. Alternatively, the worker can arrange the bundles directly at the transfer station of the vertical conveyor.

The vertical conveyor includes a plurality of carrier plates which each operate to transfer a layer of bundles from the transfer station to a delivery station on the other side thereof, with the carrier plates always operating to maintain the layers of bundles in an upright position. Each carrier plate includes a plurality of pushers, so that when a layer of bundles is deposited at the delivery station, the pushers of the next carrier plate operate to push the layer of bundles from the delivery station onto a stripping conveyor which moves the layer up against a striker plate arranged above a stack-forming means, such as a downstacker. The downstacker is surrounded by the stripping conveyor which includes at least one opening therein so that when the opening moves into position under the layer of bundles which are engaging the striker plate, the layer will be deposited through the opening and onto a vertically-movable platform of the downstacker. The platform is incrementally actuated downwardly each time another layer of bundles is deposited thereon so as to form the desired stack. After a stack of the desired height is formed, the platform is moved downwardly to its discharge position, so that the formed stack may be discharged from the downstacker and have straps applied thereto. Actuating means are provided for supplying control signals to the loading conveyor and the vertical conveyor to stop or slow down their operation during the time that a layer is being deposited as well as bring the time that the formed stack is being discharged and the platform of the downstacker is being returned to its uppermost position to receive the next layer of bundles.

Advantageously, the improved palletizing system of the present invention operates to coordinate the various functions of making bundles and supplying them to a loading conveyor, arranging the bundles into layers at the loading conveyor, transferring the layers of bundles to a stack-forming means, forming the layers into stacks on pallets, strapping the stacks to the pallet, and discharging the loaded pallets ready for shipment. In addition, the vertical conveyor operates to energize the loading conveyor so that a layer of bundles will not be transferred to the vertical conveyor until the previous layer of bundles has been removed from the transfer station and is on its way to the delivery station of the vertical conveyor. Further, as a result of the improved palletizing system of the present invention, jam-ups are avoided, since the operations of the loading conveyor and the vertical conveyor are intermittently stopped or slowed during the time that a formed stack is being transferred to the discharge position of the downstacker and the platform is being returned upwardly to its receiving position. Moreover, the operation and speed of the vertical conveyor and stripping conveyor are coordinated and synchronized. In addition, the need for a worker positioned at the downstacker is eliminated, since the bundles are formed into layers by a worker positioned at the loading conveyor or at the transfer station.

BRIEF DESCRIPTION OF THE DRAWINGS

Further objects, features, and advantages of the present invention will become apparent upon the consideration of the following detailed description of a presently-preferred embodiment when taken in conjunction with the accompanying drawings, wherein:

FIG. 9 is a schematic diagram illustrating another embodiment of the present invention.

DETAILED DESCRIPTION OF PREFERRED EMBODIMENTS OF THE INVENTION

Figure 1:
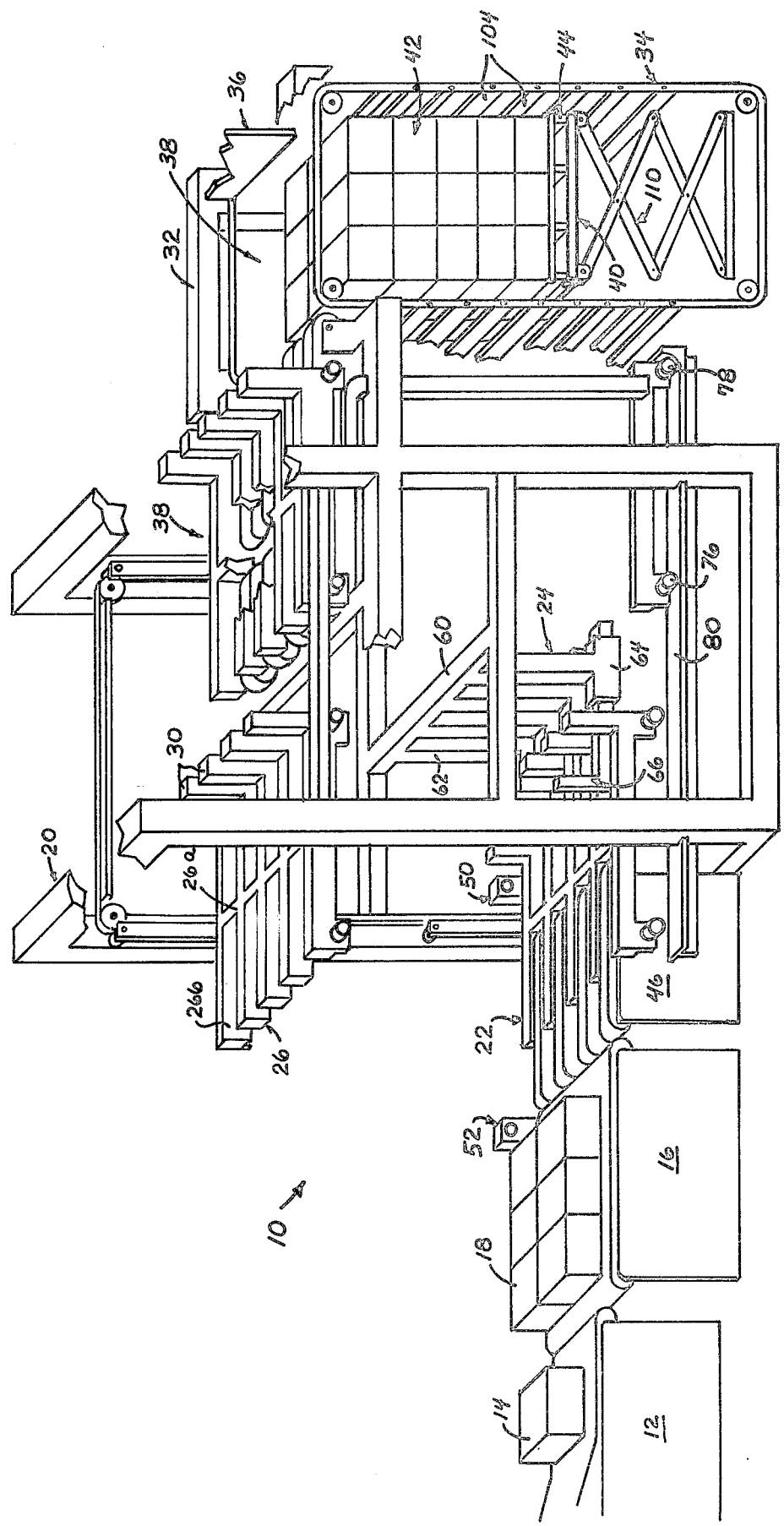
FIG. 1 is a perspective view of the overall palletizing system of the present invention which includes an infeed conveyor, a loading conveyor, a vertical conveyor, and a downstacker surrounded by a stripping conveyor.

Referring now to FIG. 1, there is shown the improved palletizing system of the present invention, generally designated by the reference numeral 10. Generally, the system includes an infeed conveyor 12 for supplying a row of bundles 14 and also includes a loading conveyor 16 at which a worker is located who operates to arrange the bundles 14 into a desired pattern to form a layer 18 of bundles on the loading conveyor 16. Of course, it should be understood that the layer 18 of bundles can include one or more bundles, which usually depends on the size of the bundles. The loading conveyor 16 is intermittently operated to transfer each layer 18 of bundles to a vertical conveyor 20 which includes a transfer station 22. The layer 18 of bundles is transferred against an adjustable backstop assembly 24, and the vertical conveyor 20 includes a plurality of carrier plates 26 for transferring the layer of bundles from transfer station 22 to a delivery station 28 located on the other side of the vertical conveyor, with each of the carrier plates 26 including a plurality of pusher arms 30. The pusher arms 30 operate to push a layer of bundles from the delivery station 28 to a stack-forming means, such as a downstacker 32, disposed inside of a stripping conveyor 34. Actually, the pusher arms 30 of a carrier plate 26 operate to push a layer 18 of bundles from delivery station 28 to engage a striker plate 36 disposed above stripping conveyor 34. The stripping conveyor 34 includes openings 38 through which the layer of bundles is deposited onto a vertically-movable platform 40 of downstacker 32. The vertically-movable platform 40 is incrementally actuated downwardly each time another layer 18 is deposited thereon to form the stack 42 on a pallet 44. After the desired stack 42 is formed, platform 40 is lowered to its discharge position, so that the formed stack 42 and pallet 44 are discharged from the downstacker 32 and, if desired, straps (not shown) are applied thereto.

As shown most clearly in FIG. 1, the infeed conveyor 12 supplies bundles 14 in a row to the loading station at which a worker is located. For example, if the present system is being employed in the box-folding industry, corrugated board or boxes are folded into a flat configuration and then stacked to form the bundles 14, which may be either loose or tied. Typically, the bundles 14 are supplied to the infeed conveyor 12 from a folding, gluing, or stitching machine; but, of course, infeed conveyor 12, which is of substantially conventional structure, may operate to transfer bundles 14 from any previous work station.

The worker positioned at the loading station operates to remove bundles 14 from the infeed conveyor 12 and to arrange the bundles into a layer 18 in any desired pattern on the loading conveyor 16 which operates intermittently. More particularly, the loading conveyor 16 includes a drive arrangement (to be explained below) having a clutch-brake controller to intermittently stop the loading conveyor 16 so that the worker may arrange thereon the bundles 14 into the desired layer 18 of bundles. The clutch-brake controller for loading conveyor 16 is operated by a photoelectric sensor 50 disposed on vertical conveyor 20. As a carrier plate 26 moves upwardly from transfer station 22 with a layer 18 disposed thereon, photoelectric sensor 50 senses the layer 18 as it passes and operates to energize the clutch of the clutch-brake controller to actuate the loading conveyor 16 into its operative mode so that it transfers the layer 18 which has just been formed on loading conveyor 16 to transfer station 22.

As will be explained, a continuously-operating conveyor 46 is disposed at transfer station 22 and operates to continuously push layer 18 against the adjustable backstop assembly 24 of vertical conveyor 22. A carrier plate 26 then moves upwardly through continuous conveyor 46 and operates to lift layer 18 off of conveyor 46 and transfer same to delivery station 28, in a manner to be explained. It is when layer 18 passes photoelectric sensor 50 that it operates to energize loading conveyor 16 to transfer the next layer 18 of bundles to transfer station 22. In addition, a photoelectric sensor 52 is disposed in front of loading conveyor 16 and operates to sense a layer 18 which is being transferred from loading conveyor 16 to transfer station 22. After the layer 18 passes photoelectric sensor 52, it operates to signal the brake of the clutch-brake controller of loading conveyor 16 to intermittently stop loading conveyor 16 so that the next layer 18 of bundles may be arranged thereon by the worker at the loading station, in the manner explained above.

Figure 3:
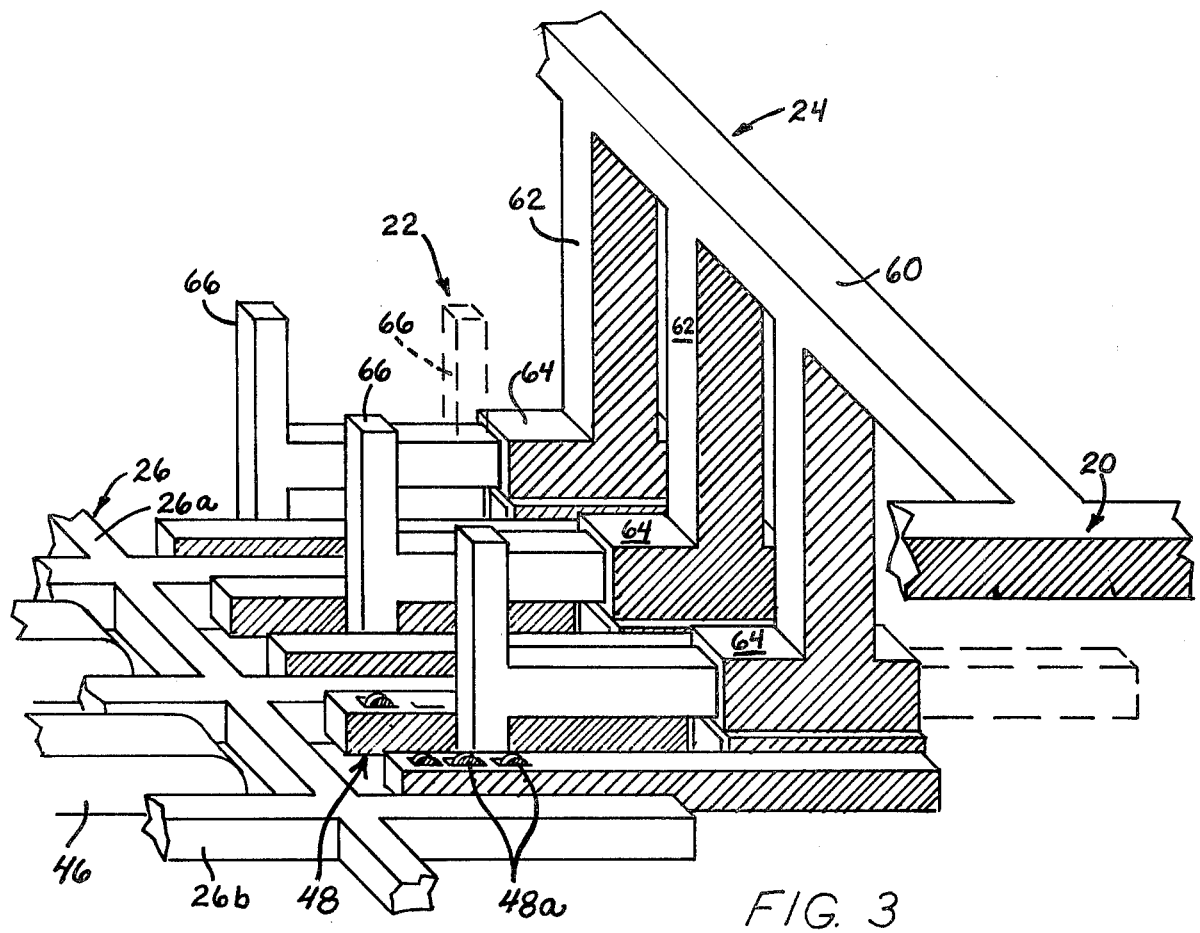
FIG. 3 is a detailed perspective view illustrating the adjustable backstop assembly of the vertical conveyor and the interlineation of a carrier plate with the receiving bars at the transfer station of the vertical conveyor.
Figure 4:
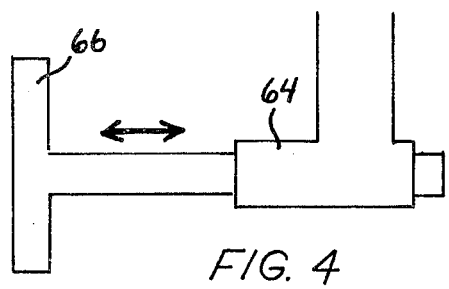
FIGS. 4 and 5 are side elevational views of the backstop assembly illustrating it in different adjusted positions.
Figure 5:
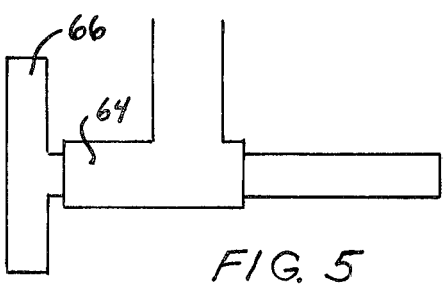

The details of the transfer station 22 may be seen most clearly in FIG. 3. More particularly, it illustrates the adjustable backstop assembly 24 which is interlineated with a depositing conveyor or station 48, which is part of vertical conveyor 20, which depositing station 48 is also interlineated with an upwardly-moving carrier plate 26, and plate 26 is also interlineated with conveyor 46. More particularly, adjustable backstop assembly 24 includes a crossbar 60 which is mounted on the frame of vertical conveyor 20 and includes a plurality of downwardly-depending legs 62 which are each provided with sleeves 64 in which stops 66 are slidably movable. In this manner, the position of stops 66 may be adjusted according to the size of the layer 18 which is being supplied to transfer station 22 from loading conveyor 16. Referring to FIGS. 4 and 5, stops 66 are shown in different positions which are adjusted to compensate for the size of the layer 18 being transferred.

As may be seen in FIG. 3, depositing station 48 is formed of a plurality of rollers, casters, transfer balls, or similar devices 48a. In this manner, a layer 18 of bundles is continuously driven by continuous conveyor 46 onto rollers 48a to be pushed against stops 66 of backstop assembly 24 until a carrier plate 26 removes layer 18 from the transfer station 22. Each carrier plate 26 includes a transverse crossbar 26a connected to a plurality of longitudinally-extending, spaced-apart arms 26b. In this manner, as carrier plate 26 passes through transfer station 22 to lift a layer of bundles off of conveyor 46 and depositing station 48, crossbar 26a passes between continuous conveyor 46 and depositing station 48, whereas the arms 26a of carrier plate 26 on one side of crossbar 26a pass between and interlineate with stops 66 of backstop assembly 24 and rollers 48a of depositing station 48, and on the other side of crossbar 26a, arms 26b pass between and interlineate with continuous conveyor 46. In this manner, as carrier plate 26 moves upwardly and interlineates with depositing station 48 and continuous conveyor 46, the layer 18 of bundles is lifted off of these members and transferred from transfer station 22 to delivery station 28 by carrier plate 26.

Figure 2:
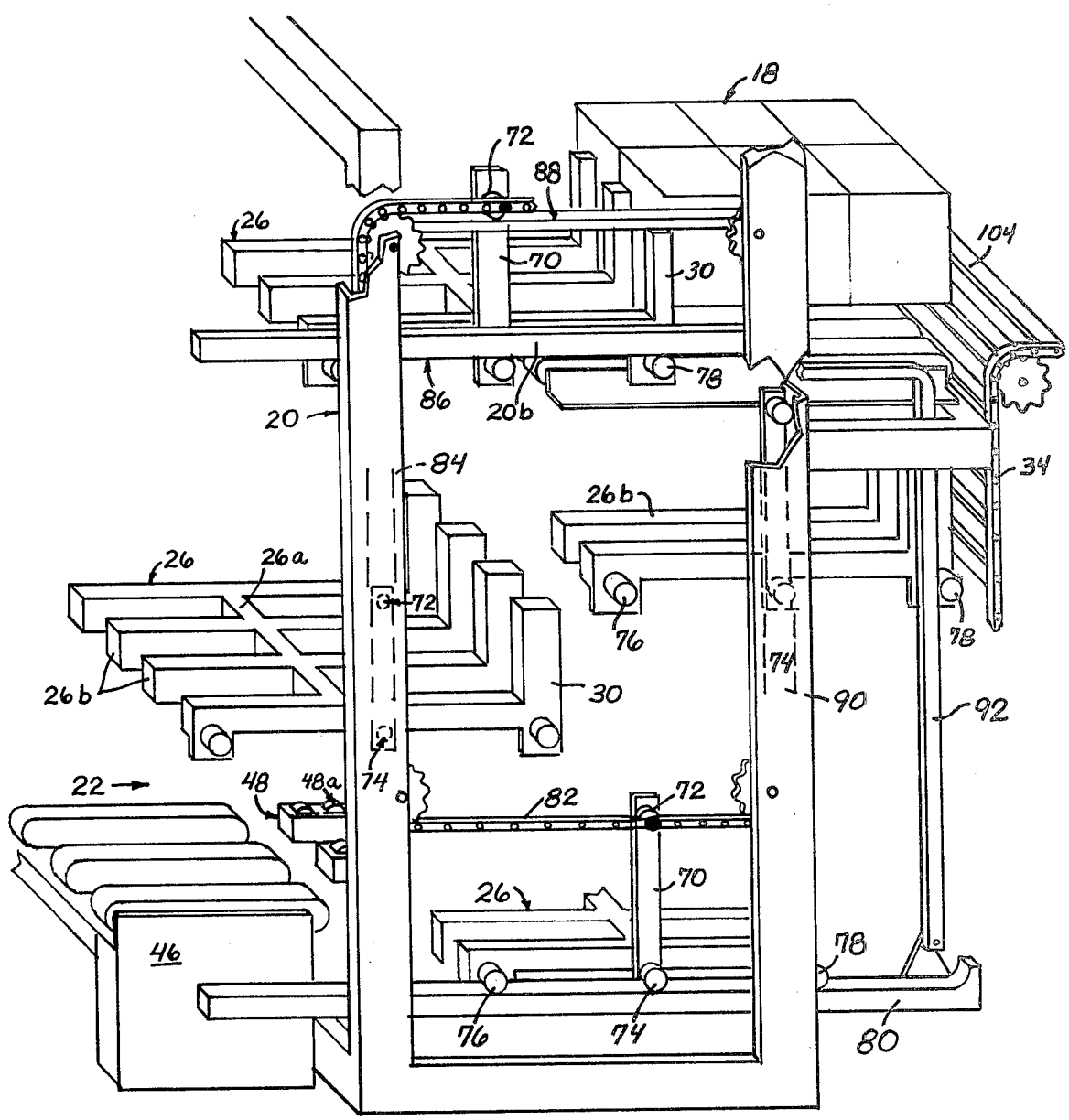
FIG. 2 is a perspective view in detail of the vertical conveyor employed in the system of the present invention, particularly illustrating the pushers of a carrier plate pushing a layer of bundles from the delivery station of the vertical conveyor to the stripping conveyor surrounding the downstacker.

Referring now to FIGS. 1 and 2, the movement of carrier plates 26 relative to the frame of vertical conveyor 20 will be explained. More particularly, each carrier plate 26 includes vertically-oriented supporting bars 70 on each side thereof. In addition, each side of carrier plate 26 includes supporting rollers 72, 74 mounted on the upper and lower ends of each supporting bar 70, and supporting rollers 76, 78 located on each end of the outermost arms 26b. In this manner, rollers 72, 74, 76, and 78 of each carrier plate 26 ride on trackways formed in the frame of vertical conveyor 20 as the carrier plate 26 moves between transfer station 22 and delivery station 28. It should also be noted that the rollers of carrier plate 26 and the trackways of vertical conveyor 20 cooperate to maintain carrier plates 26 in a substantially horizontal position during their entire traverse of vertical conveyor 20 so that each layer 18 of bundles is always maintained in a horizontal orientation.

More particularly, referring to FIG. 2, during the lower horizontal traverse of carrier plate 26, rollers 74, 76, and 78 ride on a trackway 80, while roller 72 rides on a trackway 82. When carrier plate 26 reaches the end of its lower traverse, it begins moving upwardly on a trackway 84 formed on the frame of vertical conveyor 20, with rollers 72, 74 riding in trackway 84. During such upward movement, it is noted that the moment of force about carrier plate 26 is in a clockwise direction (due to the unbalance of carrier plate 26 caused by the weight of pushers 30), with roller 74 tending to move to the left, which movement is of course prevented by trackway 84. When carrier plate 26 completes its upward movement, it begins to move to the right along its upper horizontal traverse. During such upper horizontal traverse, rollers 74, 76, and 78 ride on the lower surface of a crossbar 20b of the frame of vertical conveyor 20 having a trackway 86. In addition, roller 72 rides along a trackway 88 so that carrier plate 26 is maintained in a horizontal orientation during such upper traverse. During the downward movement of carrier plate 26, the rollers traverse two parallel trackways 90, 92. More particularly, rollers 78 of carrier plate 26 traverse outer trackway 92, while rollers 72, 74 traverse inner trackway 90. During this downward movement of carrier plate 26, outer trackway 92 is required to prevent carrier plate 26 from tending to rotate in a clockwise direction and out of its horizontal orientation. Accordingly, it should be clear that each carrier plate 26 and its load of bundles are maintained in a horizontal orientation during their traverse of vertical conveyor 20.

Figure 6:
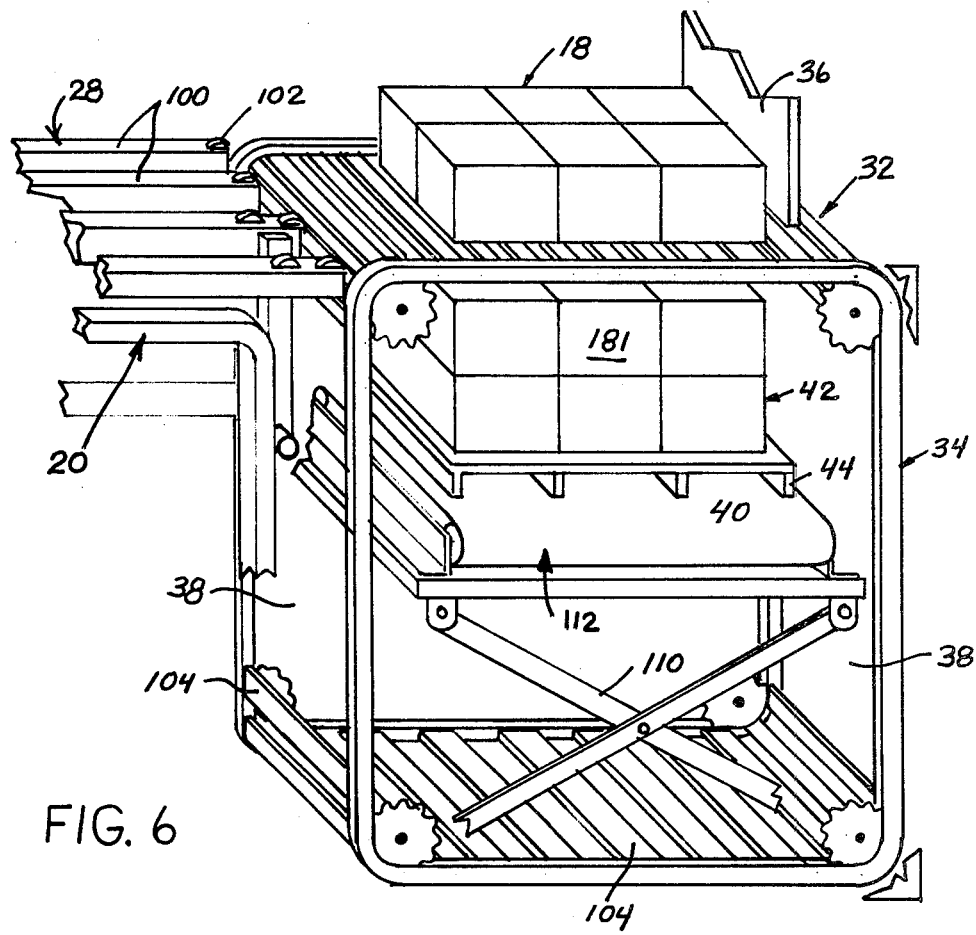
FIG. 6 is a perspective view, in detail, of the delivery station of the vertical conveyor and the downstacker of the present invention illustrating a layer of bundles which has been pushed against the striker plate above the downstacker and is ready to be deposited on a layer which has previously been deposited on the downstacker.
Figure 7:
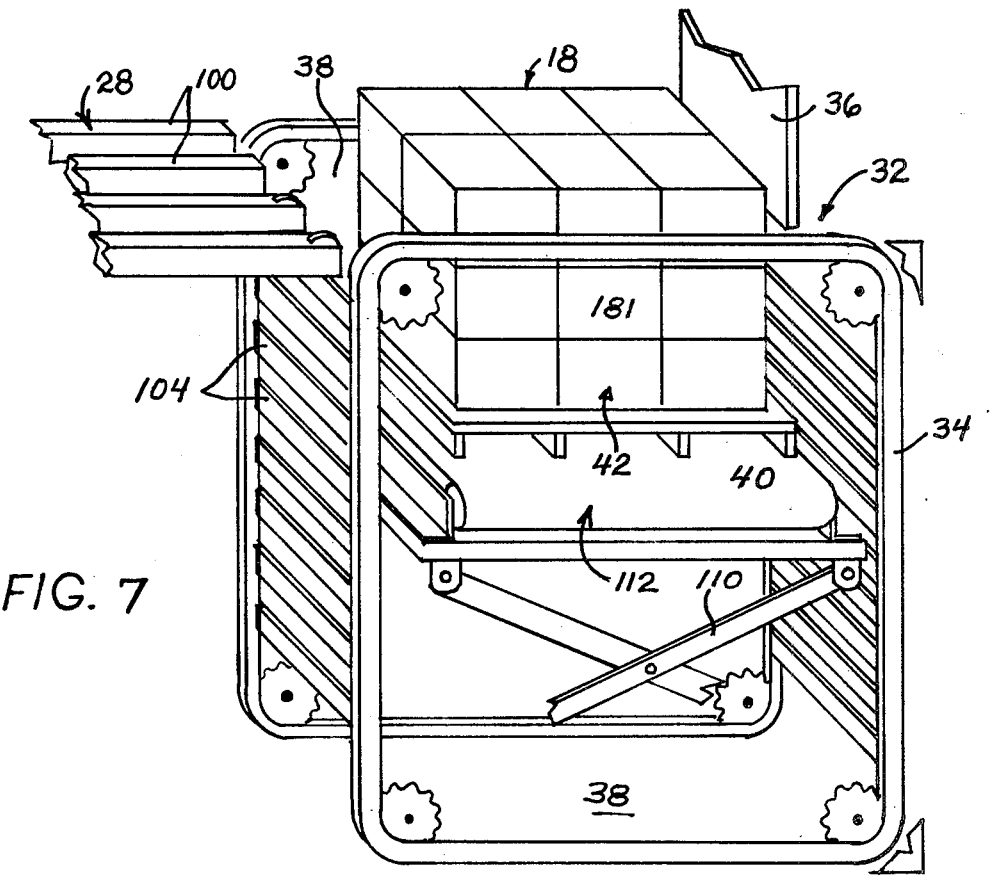
FIG. 7 is also a perspective view, in detail, of the downstacker employed in the present invention illustrating a layer of bundles being deposited through the conveyor surrounding the downstacker and onto a previously-deposited layer on the downstacker.

Turning now to FIGS. 6 and 7, there is shown in detail the cooperation of the delivery station 28 of vertical conveyor 20, with downstacker 32 and the stripping conveyor 34 surrounding it. More particularly, as explained above, a layer 18 of bundles is transferred by a carrier plate 26 to delivery station 28, and the pusher arms 30 of the next carrier plate 26 operate to push the layer 18 from the delivery station 28 onto stripping conveyor 34 and against striker plate 36. Delivery station 28 is somewhat similar to transfer station 22 in that delivery station 28 includes a plurality of longitudinally-extending bars 100 having rollers 102 mounted therein. Alternatively, rollers 102 can be driven by a power conveyor to reduce the dependency on pushers 30. In this manner, as pusher arms 30 push layer 18, the layer 18 rolls on rollers 102 and onto slats 104 of stripping conveyor 34. In addition, in a manner similar to transfer station 22, the bars 100 of delivery station 28 are spaced apart so that the arms 26b of carrier plate 26 pass through them and interlineate with them when the carrier plate 26 passes through delivery station 28 to deposit the layer 18 at the delivery station 28. Reference may be made to FIG. 1 for illustration of the interlineation of arms 26b of carrier plate 26 and bars 100 of delivery station 28.

Referring again to FIG. 6, the layer 18 of bundles is shown engaging striker plate 36, as stripping conveyor 34 continues to rotate about downstacker 32. As explained above, two openings 38 are formed in stripping conveyor 34 by the deletion of a plurality of slats 104. The length of each opening 38 is approximately equal to one-fourth of the length of conveyor 34. In this manner, as an opening 38 reaches the top of downstacker 32, bundles 14 of layer 18 will begin to fall through opening 38 and onto the previously-deposited layer 18', or if it is the first layer being deposited, onto pallet 44 located on vertically-movable platform 40 of downstacker 32. As will be understood, platform 40 is adapted to receive an empty pallet 44, and each layer 18 of bundles 14 is deposited onto pallet 44 or onto the preceding layer 18' to form a stack 42 of layers. After each layer 18 of bundles has been deposited through opening 38 of conveyor 34, platform 40 is incrementally actuated downwardly a distance equal to the height of the layer which is deposited thereon to form the stack 42. It should also be noted that downstacker 32 may be of any conventional structure which is actuated incrementally downwardly each time another layer of articles is received. In the embodiment shown, platform 40 of downstacker 32 is supported by a scissor-like linkage arrangement 110 which operates to collapse incrementally each time another layer of bundles is deposited thereon so that platform 40 is then ready to receive the next layer 18 of bundles from delivery station 28. As will be explained below, platform 40 includes a drive for transferring platform 40 between a receiving position, at which it receives a layer of bundles, and a discharge position, at the bottom of downstacker 32 for discharging the formed stack 42 and pallet 44. When the desired number of layers has been deposited on pallet 44, the completed load on platform 40 is lowered to the discharge position at the bottom of downstacker 32 and is then ready to be discharged therefrom.

Accordingly, downstacker 32 is also provided with a discharge conveyor 112 which is operated to discharge the loaded pallet 44 to the next station where it is readied for shipment. In the present embodiment, the platform 40 forms the upper surface of discharge conveyor 112, which may be a conventional conveyor. The next station in the system may include a conventional strapping machine for applying straps to the loaded pallet so that it is ready to be shipped. Once the loaded pallet is discharged to the next station, the downstacker 32 including platform 40 is returned upwardly to its receiving position at the top of downstacker 32 where platform 40 is then ready to receive the next layer 18 of bundles 24 to be deposited thereon to form the next stack. Of course, before platform 40 is returned to its receiving position, an empty pallet 44 is either manually or automatically placed thereon.

Figure 8:
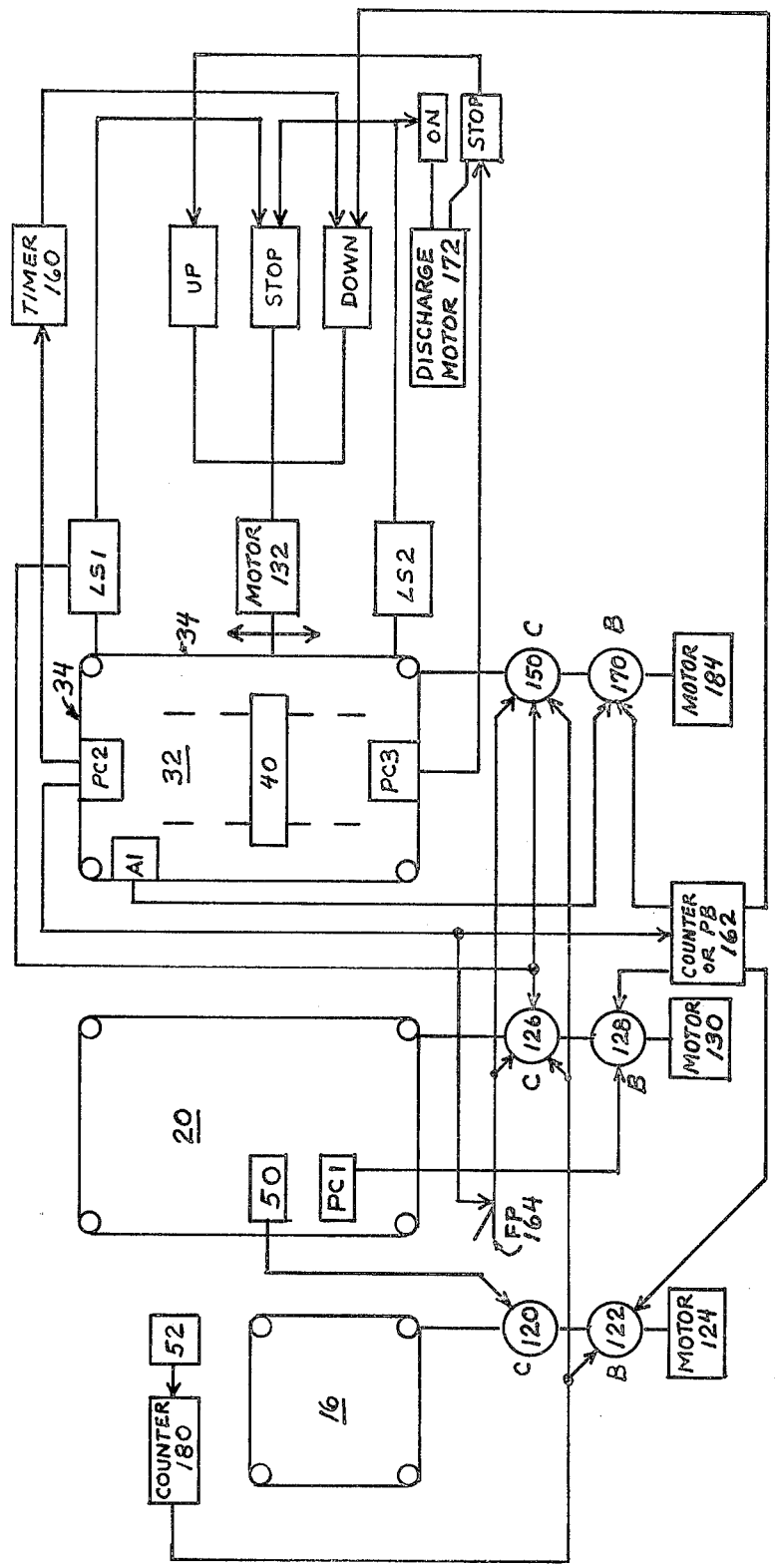
FIG. 8 is a schematic diagram illustrating one embodiment of the control circuit for controlling the palletizing system of the present invention.

Referring now specifically to FIG. 8, there is shown the overall control circuit for controlling and coordinating the various functions of the improved palletizing system 10 of the present invention in a semiautomatic manner. As shown, the driving means for loading conveyor 16 include a clutch 120, a brake 122, and a motor 124, and the driving means for vertical conveyor 20 include a clutch 126, a brake 128, and a motor 130. Alternatively, the system can be operated by simply stopping and starting motors 124 and 130 directly via suitable relays. A photoelectric sensor 50, which is disposed adjacent vertical conveyor 20, senses each time a layer 18 is lifted upwardly by a carrier plate 26 from transfer station 22 and operates to send a signal to clutch 120 to engage and drive loading conveyor 16 to supply the next layer of bundles to transfer station 22. To insure that the next carrier plate 26 is in position to receive the next layer, a photocell PC1 operates to stop the next carrier plate 26 at transfer station 22 by actuating brake 128. When the next layer 18 of bundles leaves loading conveyor 16 and is on its way to transfer station 22, it passes a photoelectric sensor 52 which operates to send a signal to brake 122, to stop loading conveyor 16 so that the next layer of bundles may be arranged thereon, and signals are also sent to clutches 126 and 150 to re-energize vertical conveyor 20 and stripping conveyor 34. In this manner, motor 124, clutch-brake arrangement 120, 122, and clutch-brake arrangement 126, 128 operate to intermittently drive loading conveyor 16 and vertical conveyor 20 so that each carrier plate 26 of vertical conveyor 20 receives a layer 18 of bundles and transfers it to downstacker 32.

As will also be seen in FIG. 8, platform 40 of downstacker 32 is driven by a reversible motor 132, which is controlled by up and down solenoids, as shown. Further, photocell PC2 and limit switch LS1 are located at the top of downstacker 32, and photocell PC3 and limit switch LS2 are located at the bottom of downstacker 32, for a purpose to be explained.

As explained above, layers 18 are pushed by pusher arms 30 from the delivery station 28 to the stripping conveyor 34 surrounding downstacker 32. At the downstacker, the layer 18 passes through opening 38 and is deposited on platform 40. In this manner, each layer 18 is deposited on pallet 44 or the previously-deposited layer on platform 40. It should also be noted that in the preferred embodiment, a sensor A1 is employed which senses when opening 38 has passed it and operates to energize brake 170 to stop conveyor 34. This insures that conveyor 34 will be synchronized with vertical conveyor 20 and in proper position to receive the next layer.

Photocell PC2, which is disposed at the receiving position of downstacker 32, emits a light beam which is interrupted when a layer is deposited on platform 40 and operates to energize the down solenoid connected to motor 132 after a short time delay caused by timer 160. The time delay insures that the entire layer drops through opening 38 and onto platform 40 before platform 40 begins to move downwardly. Motor 132 operates to move the platform 40 incrementally toward the discharge position a distance equal to the height of bundles 14 so that layer 18 clears photocell PC2, and platform 40 is ready to receive the next layer of bundles to be deposited thereon. When the light beam of photocell PC2 is no longer interrupted by the layer 18, which has been moved downwardly, the energization of the down solenoid is discontinued, and platform 40 stops at its incrementally-lowered position so that it is ready to receive the next layer of bundles. In addition, when PC2 is cleared and sees light, it actuates a counter 162 which counts the number of layers in the stack, and it also renders a foot pedal 164 operative, for a purpose to be explained.

After a series of layers 18 have been stacked on platform 40 to form a stack of a desired height, the loaded pallet is ready to be discharged by discharge conveyor 112. However, platform 40 is not normally at its lowermost discharge position when the stack is completed. Therefore, it is necessary to provide control apparatus for lowering platform 40 to its lowermost discharge position. Counter 162 operates to count the number of layers in a stack. That is, the operator, who is positioned at the loading station and arranges the bundles 14 into a layer 18 on loading conveyor 16, would also function to dial into counter 162 the desired number of layers in a stack, for example, five or six. In this manner, as each layer is deposited on platform 40, PC2 operates to signal counter 162. When counter 162 reaches the dialed-in number of layers indicating that a stack of the desired height has been formed, counter 162 operates to signal the down solenoid to lower platform 40 to its discharge position, and counter 162 also operates to energize brakes 122 and 128 to discontinue the operation of loading conveyor 16, vertical conveyor 20, and stripping conveyor 34, so that their operations are discontinued until platform 40 has discharged the loaded pallet and returns to its receiving position at the upper end of downstacker 32. In this manner, as the operations of loading conveyor 16 and vertical conveyor 20 are discontinued, this insures that no further additional layers 18 will be supplied to downstacker 32 before platform 40 is returned to its receiving position. Alternatively, counter 162 can be replaced with a push button which would be actuated by the operator to lower platform 40 to its discharge position and to energize brakes 122 and 128.

Accordingly, when platform 40 reaches its discharge position, it actuates limit switch LS2, which is disposed at the discharge position. Limit switch LS2 operates to de-energize motor 132 for platform 40 and also operates to energize a motor 172 to drive the discharge conveyor 112 to discharge the loaded pallet from downstacker 32. A photocell PC3 senses that the pallet has been discharged and operates to stop discharge motor 172 and to energize the up solenoid to return platform 40 to its receiving position at the upper end of downstacker 32 so that it is ready to receive the next layer 18 of bundles to be deposited thereon. When platform 40 reaches the receiving position, it actuates a limit switch LS1 which de-energizes motor 132 and stops platform 40 at the uppermost position. Limit switch LS1 and/or photocell PC2 also operate to energize the clutch 126 of vertical conveyor 20 and the clutch 150 of stripping conveyor 34 so that vertical conveyor 20 and stripping conveyor 34 resume operation to supply layers 18 of bundles to platform 40 at the receiving position of downstacker 32.

As stated above, a foot pedal 164 is provided, and it is rendered operative when photocell PC2 is cleared and sees light, which means that platform 40 is ready to receive the next layer of bundles. Accordingly, foot pedal 164 cannot be operated while platform 40 is still receiving a layer 18 from stripping conveyor 34. Once foot pedal 164 is rendered operative, it can be actuated to energize clutch 126 of vertical conveyor 20 and clutch 150 of stripping conveyor 34. In this manner, an operator can arrange layers of one or more bundles directly at transfer station 22, rather than arranging the layers on loading conveyor 16. Once the operator has completed arranging the layer at transfer station 22, he can then actuate foot pedal 164 to drive vertical conveyor 20 and stripping conveyor 34 to transfer the layer from transfer station 22 to delivery station 38 and to stripping conveyor 34. Accordingly, if the system of the present invention is employed so that the operator arranges the bundle directly at transfer station 22, then it would not be necessary to employ loading conveyor 16, clutch-brake arrangement 120–122, sensor 50, and sensor 52.

However, it should also be noted that if loading conveyor 16 and the controls therefore are not employed in the system, transfer station 22 could also be used for another purpose in addition to arranging the bundles into a layer. More particularly, the bundles themselves can be formed on transfer station 22 by automatically stacking the boxes thereon to form the bundles. In this regard, a counter 180 would be employed in conjunction with photocell 52 to automatically count the number of boxes in a bundle and to control the supply of boxes from a feeding conveyor to transfer station 22 and/or to control the starting of vertical conveyor 20.

It should also be noted that feeding conveyor 12 may be in the form of a gravity feed conveyor to supply bundles to loading conveyor 16. In addition, loading conveyor 16 would be operated at a faster speed than feeding conveyor 12 so that the bundles would be pulled off of conveyor 12 and into the system.

Referring now specifically to FIG. 9, there is shown an overall control circuit for controlling and coordinating the various functions of the improved palletizing system 10 of the present invention in a continuous and fully automatic manner. As shown, the driving means for loading conveyor 16 include a clutch 120, a brake 122, and a motor 124, and the driving means for vertical conveyor 20 include a clutch 126, a brake 128, and a motor 130. Alternatively, the system can be operated by simply stopping and starting motors 124 and 130 directly via suitable relays. A photoelectric sensor 50, which is disposed adjacent vertical conveyor 20, senses each time a layer 18 is lifted upwardly by a carrier plate 26 from transfer station 22 and operates to send a signal to clutch 120 to engage and drive loading conveyor 16 to supply the next layer of bundles to transfer station 22. When the next layer 18 of bundles leaves loading conveyor 16 and is on its way to transfer station 22, it passes a photoelectric sensor 52 which operates to send a signal to brake 122, to stop loading conveyor 16 so that the next layer of bundles may be arranged thereon. In this manner, motor 124 and clutch-brake arrangement 120, 122 operate to intermittently drive loading conveyor 16 so that each carrier plate 26 of vertical conveyor 20 receives a layer 18 of bundles and transfers it to downstacker 32.

As will also be seen in FIG. 9, platform 40 of downstacker 32 is driven by a reversible motor 132, which is controlled by up and down solenoids, as shown. Further, photocell PC2 and limit switch LS1 are located at the top of downstacker 32, and photocell PC3 and limit switch LS2 are located at the bottom of downstacker 32, for a purpose to be explained.

As explained above, layers 18 are pushed by pusher arms 30 from the delivery station 28 to the stripping conveyor 34 surrounding downstacker 32. At the downstacker, the layer 18 passes through opening 38 and is deposited on platform 40. In this manner, each layer 18 is deposited on pallet 44 or the previously-deposited layer on platform 40.

Photocell PC2, which is disposed at the receiving position of downstacker 32, emits a light beam which is interrupted when a layer is deposited on platform 40 and operates to energize the down solenoid connected to motor 132 after a short time delay caused by timer 160. The time delay insures that the entire layer drops through opening 38 and onto platform 40 before platform 40 begins to move downwardly. Motor 132 operates to move the platform 40 incrementally toward the discharge position a distance equal to the height of bundles 14 so that layer 18 clears photocell PC2, and platform 40 is ready to receive the next layer of bundles to be deposited thereon. When the light beam of photocell PC2 is no longer interrupted by the layer 18, which has been moved downwardly, the energization of the down solenoid is discontinued, and platform 40 stops at its incrementally-lowered position so that it is ready to receive the next layer of bundles. In addition, when PC2 sees dark, it also actuates brake 128 to stop vertical conveyor 20 and stripping conveyor 34 so that additional layers are not supplied to platform 40 while it is being lowered. When PC2 is cleared and sees light, it actuates a counter 162 which counts the number of layers in the stack, and it also actuates clutches 126 and 150 to restart vertical conveyor 20 and stripping conveyor 34 as platform 40 is ready to receive the next layer.

After a series of layers 18 have been stacked on platform 40 to form a stack of a desired height, the loaded pallet is ready to be discharged by discharge conveyor 112. However, platform 40 is not normally at its lowermost discharge position when the stack is completed. Therefore, it is necessary to provide control apparatus for lowering platform 40 to its lowermost discharge position. Counter 162 operates to count the number of layers in a stack. That is, the operator, who is positioned at the loading station and arranges the bundles 14 into a layer 18 on loading conveyor 16, would also function to dial into counter 162 the desired number of layers in a stack, for example, five or six. In this manner, as each layer is deposited on platform 40, PC2 operates to signal counter 162. When counter 162 reaches the dialed-in number of layers indicating that a stack of the desired height has been formed, counter 162 operates to signal the down solenoid to lower platform 40 to its discharge position, and counter 162 also operates to energize brakes 128, 170 to discontinue the operation of vertical conveyor 20 and stripping conveyor 34, so that their operations are discontinued until platform 40 has discharged the loaded pallet and returns to its receiving position at the upper end of downstacker 32. In this manner, as the operations of vertical conveyor 20 and stripping conveyor 34 are discontinued, this insures that no further additional layers 18 will be supplied to downstacker 32 before platform 40 is returned to its receiving position. Accordingly, when platform 40 reaches its discharge position, it actuates limit switch LS2, which is disposed at the discharge position. Limit switch LS2 operates to de-energize motor 132 for platform 40 and also operates to energize a motor 172 to drive the discharge conveyor 112 to discharge the loaded pallet from downstacker 32. A photocell PC3 senses that the pallet has been discharged and operates to stop discharge motor 172 and to energize the up solenoid to return platform 40 to its receiving position at the upper end of downstacker 32 so that it is ready to receive the next layer 18 of bundles to be deposited thereon. When platform 40 reaches the receiving position, it actuates a limit switch LS1 which de-energizes motor 132 and stops platform 40 at the uppermost position. Limit switch LS1 and/or photocell PC2 also operate to energize the clutch 126 of vertical conveyor 20 and the clutch 150 of stripping conveyor 34 so that vertical conveyor 20 and stripping conveyor 34 resume operation to supply layers 18 of bundles to platform 40 at the receiving position of downstacker 32.

The control circuit of FIG. 9 also includes an arrangement for synchronizing vertical conveyor 20 and stripping conveyor 34. More particularly, the time period during which PC2 sees light is registered in a timer 180. If this time period is too long, indicating that a layer has not been transferred to stripping conveyor, timer 180 operates to actuate a speed control programmer 182 which controls the speed of motors 130 and 184. In this manner, the speeds of vertical conveyor 20 and stripping conveyor 34 can be synchronized so that there is no unnecessary delay in transferring layers to conveyor 34. Such a speed-control arrangement is particularly useful to compensate the system for bundles of different heights. That is, when the bundles are relatively high, the speed of the system will be slowed; whereas if the bundles are relatively short, the speed of the system will be increased.

In view of the foregoing, it will be appreciated that the present invention has provided an improved palletizing system which eliminates the need for a worker at the downstacker, as the worker adjacent loading conveyor 16 can operate to control the entire system by arranging the desired pattern or layer on loading conveyor 16 and by simply dialing into counter 162 the number of layers desired in a stack. Alternatively, the bundle or layer can be placed directly on transfer station 22 and the system controlled by foot pedal 164. It will also be noted that the improved palletizing system of the present invention automatically transfers layers of bundles from a loading conveyor to a downstacker and automatically forms the layers into stacks on pallets which may be automatically discharged from the downstacker. Moreover, in one embodiment, the system can be efficiently synchronized through the use of a speed-control arrangement.

In addition, it will also be appreciated that one embodiment of the improved palletizing system of the present invention also operates to intermittently stop the loading conveyor and vertical conveyor while the platform of the downstacker operates to transfer a formed stack to its discharge position, discharge the loaded pallet for shipment, and return to its receiving position of the downstacker so that it is ready to receive the next layer of bundles. Simultaneously, the operation of the loading conveyor and vertical conveyor are resumed to supply the layers to the downstacker. It should also be understood that once the vertical conveyor and loading conveyor resume operation, the vertical conveyor will operate to intermittently energize the loading conveyor to transfer layers of bundles to the vertical conveyor. Therefore, in accordance with the improved palletizing system of the present invention, all of its functions are synchronized and coordinated.

A latitude of modification, change, and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for organizing and arranging layers of one or more bundles into stacks, comprising:
   means responsive to a first control signal for supplying a layer of bundles to a transfer station at a loading elevation;
   means for elevating and transferring said layer of bundles from said transfer station to a delivery station at a transferring elevation which is greater than the maximum elevation of the stack to be formed, said elevating and transferring means maintaining said layer substantially horizontally disposed during said elevating and transferring operation, said elevating and transferring means being operable to supply said first control signal to said supplying means to supply said layer of bundles to said transfer station;

stack-forming means adjacent said transferring means including a movable platform for sequentially receiving said layers from said delivery station to form a stack of layers on said movable platform, said platform being responsive to a second control signal to move between a receiving position and a discharge position;

first actuating means for supplying said second control signal to said platform to move said formed stack to said discharge position so that said formed stack may be discharged; and said first actuating means also operating to supply a third control signal to said supplying means and a fourth control signal to said transferring means to interrupt the operation of said supplying means and said transferring means until said platform returns to said receiving position and is ready to receive the next layer of bundles from said delivery station.

2. Apparatus in accordance with claim 1 wherein said supplying means includes a loading conveyor on which bundles are arranged into layers of bundles.

3. Apparatus in accordance with claim 1 wherein said transferring means includes a conveyor for elevating said layers, said elevating conveyor having a plurality of carrier members for transferring said layers from said transfer station to said delivery station.

4. Apparatus in accordance with claim 3 wherein each of said carrier members includes spaced-apart members arranged to interlineate with and pass through spaced-apart members of said transfer station and said delivery station to transfer said layers from said transfer station to said delivery station.

5. Apparatus in accordance with claim 3 wherein said transfer station and said delivery station each include a plurality of spaced-apart members, and said carrier members each include a plurality of spaced-apart members, the spaced-apart members of said carrier members being arranged to interlineate with and pass through the spaced-apart members of said transfer station and said delivery station to transfer said layers from said transfer station to said delivery station.

6. Apparatus in accordance with claim 1 wherein said transferring means includes a sensor being operable to supply said first control signal to actuate said supplying means to supply said layer of bundles to said transfer station.

7. Apparatus in accordance with claim 3 wherein said transferring means includes a sensor for sensing the passage of each of said carrier members and being operable to supply said first control signal to actuate said supplying means to supply said layer of bundles to said transfer station.

8. Apparatus in accordance with claim 1 wherein said stack-forming means includes a downstacker surrounded by a conveyor for sequentially receiving said layers from said delivery station.

9. Apparatus in accordance with claim 8 wherein said downstacker conveyor includes at least one opening through which said layers of bundles are deposited on said movable platform.

10. Apparatus in accordance with claim 1 wherein said first actuating means includes a manually-controlled switch for supplying said second control signal to said platform and for supplying said third control signal to said supplying means and for supplying said fourth control signal to said transferring means.

11. Apparatus in accordance with claim 1 wherein said first actuating means includes a counter for automatically counting the number of layers deposited on said movable platform.

12. Apparatus in accordance with claim 11 further including a sensor disposed at said stack-forming means for sensing the deposit of a layer on said movable platform and being operable in response thereto to supply a signal to said counter.

13. Apparatus in accordance with claim 3 wherein said elevating conveyor includes a plurality of trackways and said carrier members each include a plurality of rollers for riding in said trackways so as to maintain said carrier members in a substantially horizontal position during the entire traverse of said carrier members between said transfer station and said delivery station.

14. Apparatus in accordance with claim 3 wherein said carrier members each include a plurality of pusher arms disposed thereon for pushing a layer of bundles from said delivery station to said stack-forming means.

15. Apparatus in accordance with claim 3 wherein said transferring means further includes a backstop assembly at said transfer station, said supplying means being operable to transfer said layer of bundles against said backstop assembly.

16. Apparatus in accordance with claim 15 wherein said backstop assembly includes a plurality of spaced-apart members arranged to interlineate with each of said carrier members as said carrier members pass through said transfer station.

17. Apparatus in accordance with claim 1 wherein said supplying means includes a sensor for sensing the passage of a layer of bundles to said transfer station and being operable in response thereto for intermittently stopping the operation of said supplying means.

18. Apparatus in accordance with claim 1 further including means disposed on said stack-forming means for sensing the return of said movable platform to said receiving position and being operable in response thereto to actuate said supplying means and said transferring means to transfer layers of bundles to said stack-forming means.

19. Apparatus for organizing and arranging layers of one or more bundles into stacks, comprising:

a loading station for sequentially receiving layers of bundles;

means for sequentially elevating and transferring each of said layers from said loading station to a delivery station at a transferring elevation which is greater than the maximum elevation of the stack to be formed; said elevating and transferring means including a conveyor having carrier members which remain substantially horizontally disposed while elevating and transferring said layers to said delivery station;

stack-forming means adjacent said transferring means including means for sequentially receiving said layers from said delivery station to form a stack of layers, said receiving means being responsive to a first control signal to move between a receiving position and a discharge position;

first actuating means for supplying said first control signal to said receiving means so that said formed stack is transferred to said discharge position so that the formed stack may be discharged; and said first actuating means also operating to supply a second control signal to said transferring means to discontinue the operation of said transferring means until said receiving means returns to said receiving position and is ready to receive the next layer of bundles from said delivery station.

20. Apparatus in accordance with claim 19 further including means for supplying said layers to said loading station.

21. Apparatus in accordance with claim 20 wherein said first actuating means also operates to supply a third control signal to said supplying means to interrupt the operation of said supplying means until said receiving means returns to said receiving position.

22. Apparatus in accordance with claim 21 wherein said transferring means is operable to supply a fourth control signal to actuate said supplying means to supply a layer of bundles to said loading station.

23. Apparatus in accordance with claim 19 further including second actuating means for energizing said transferring means to transfer said layers to said delivery station.

24. Apparatus in accordance with claim 23 wherein said second actuating means also operates to energize said stack-forming means.

25. Apparatus in accordance with claim 24 further including sensor means disposed at said stack-forming means for sensing the receipt of said layers and, in response thereto, for rendering operative said second actuating means.

26. Apparatus in accordance with claim 23 wherein said second actuating means is manually controlled.

27. Apparatus in accordance with claim 19 further including sensor means disposed at said stack-forming means for sensing the time period between layers received thereon and, in response thereto, said sensor means operating to control the speed of operation of said transferring means and said stack-forming means so that they are synchronized.

28. Apparatus in accordance with claim 19 further including sensor means disposed at said stack-forming means for sensing the receipt of a layer and, in response thereto, stopping the operation of said transferring means and said stack-forming means.

29. Apparatus in accordance with claim 19 wherein said stack-forming means including a lowering platform, sensor means disposed at said stack-forming means for sensing the receipt of a layer on said platform and, in response thereto, deenergizing said transferring means until said platform is ready to receive the next layer.

30. Apparatus in accordance with claim 19 further including counter means disposed at said loading station, said counter means operating to count the number of articles supplied to said loading station to form said one or more bundles, and in response thereto, to actuate said transferring means.

31. Apparatus in accordance with claim 19 further including sensor means disposed on said stack-forming means for sensing the position thereof and thereby synchronizing said stack-forming means and said transferring means.

32. Apparatus in accordance with claim 31 wherein said stack-forming means includes a conveyor having one or more openings formed therein, said conveyor surrounding said receiving means.

33. Apparatus in accordance with claim 20 further including a gravity feed conveyor for supplying bundles to said supplying means.

34. Apparatus for transferring a layer of articles from a first conveyor to a second conveyor, comprising:
a first conveyor responsive to a first control signal for supplying a layer of articles to a transfer station at a loading elevation;
a second conveyor for elevating and transferring said layer of articles from said transfer station to a delivery station at an elevation which is greater than the maximum elevation of the stack to be formed, said second conveyor having means which remain substantially horizontally disposed while elevating and transferring said layer from said transfer station to said delivery station, said second conveyor being operable to supply said first control signal to actuate said first conveyor to supply said layer to said transfer station; and
said first conveyor including aa sensor for sensing the passage of a layer of articles to said transfer station and being operable in response thereto for intermittently stopping the operation of said first conveyor.

35. Apparatus in accordance with claim 19 wherein each of said carrier members includes spaced-apart members arranged to interlineate with and pass through spaced-apart members of said loading station and said delivery station to transfer said layers from said loading station to said delivery station.

36. Apparatus in accordance with claim 35 wherein said carrier members each include a plurality of pusher arms disposed thereon for pushing a layer of bundles from said delivery station to said stack-forming means.

37. Apparatus in accordance with claim 34 wherein each of said horizontal means includes carrier members having spaced-apart members arranged to interlineate with and pass through spaced-apart members of said transfer station and said delivery station to transfer said layers from said transfer station to said delivery station.

38. Apparatus in accordance with claim 37 wherein said carrier members each include a plurality of pusher arms disposed thereon for pushing a layer of bundles out of said delivery station.

39. Apparatus for moving layers of bundles to form stacks, comprising:
means for elevating a layer from a first position to a raised position above said first position including means for maintaining said layer substantially horizontally disposed during said elevating operation;
means for horizontally transferring said layer from said raised position on said elevating means to a raised position of a stack-forming means, said means for horizontally transferring said layer being part of and movable with said elevating means; and
said stack-forming means including first means for sequentially receiving said layers from said raised position of said elevating means and for depositing said layers on a movable platform disposed at a second position lower than said raised position to form a stack of layers.

40. Apparatus in accordance with claim 39 further including means for supplying said layer of bundles to said elevating means when said elevating means is at said first position.

41. Apparatus in accordance with claim 39 wherein said elevating means includes a plurality of carrier members for elevating said layers from said first position to said raised position, and wherein said means for horizontally transferring said layer are said carrier means.

42. Apparatus in accordance with claim 41 wherein a transfer station is disposed at said first position and a delivery station is disposed at said raised position, and wherein said transfer station and said delivery station each include a plurality of spaced-apart members, and said carrier members each include a plurality of spaced-apart members, the spaced-apart members of said carrier members being arranged to interlineate with and pass through the spaced-apart members of said transfer station and said delivery station to transfer said layers from said first position to said raised position.

43. Apparatus in accordance with claim 39 wherein said stack-forming means includes a downstacker surrounded by a conveyor for sequentially receiving said layers from said elevating means and a striker plate against which said layer is pushed while it is deposited on said movable platform.

44. Apparatus in accordance with claim 43 wherein said downstacker conveyor includes at least one opening through which said layers of bundles are deposited onto said movable platform.

45. Apparatus in accordance with claim 41 wherein said elevating means includes a plurality of trackways and said carrier members each including a plurality of rollers for riding in said trackways so as to maintain said carrier members in a substantially horizontal position during the entire traverse of said carrier members between said first position and said raised position.

46. Apparatus for moving layers of bundles to form stacks, comprising:
    means for elevating a layer from a first position to a raised position above said first position including means for maintaining said layer substantially horizontally disposed during said elevating operation;
    said elevating means including a plurality of carrier members for transferring said layers from said first position to said raised position;
    said carrier members each include a plurality of pusher arms disposed thereon for pushing said layer from said raised position on said elevating means to a raised position of a stack-forming means; and
    said stack-forming means including first means for sequentially receiving said layers from said raised position of said elevating means and for depositing said layers on a movable platform disposed at a second position lower than said raised position to form a stack of layers.

47. Apparatus in accordance with claim 39 further including control means for synchronizing the operation of said elevating means, and said stack-forming means.

48. Apparatus in accordance with claim 39 wherein said means for horizontally transferring includes means for pushing said layer from said raised position on said elevating means to said raised position of said stack-forming means.

49. Apparatus in accordance with claim 48 wherein said pushing means is part of said elevating means.

50. Apparatus in accordance with claim 39 further including a receiving station at the raised position of said elevating means for receiving said elevated layer, said means for horizontally transferring said layer including means for pushing said layer from said receiving station to said stack-forming means.

51. Apparatus in accordance with claim 41 wherein said carrier members each include a plurality of pushr arms disposed thereon for pushing a layer of bundles from said elevating means to said stack-forming means.

* * * * *